(12) United States Patent
Gries et al.

(10) Patent No.: US 8,860,335 B2
(45) Date of Patent: Oct. 14, 2014

(54) SYSTEM FOR MANAGING DC LINK SWITCHING HARMONICS

(75) Inventors: Mark A. Gries, Milwaukee, WI (US); Mark R. Cooper, Eden Prairie, MN (US); Rangarajan Tallam, Germantown, WI (US); Garrett B. Rodrigues, San Carlos, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 408 days.

(21) Appl. No.: 13/295,680

(22) Filed: Nov. 14, 2011

(65) Prior Publication Data
US 2013/0119901 A1    May 16, 2013

(51) Int. Cl.
*H02M 1/14*  (2006.01)
*H02J 1/02*  (2006.01)
*H02M 1/12*  (2006.01)
*H02M 7/00*  (2006.01)

(52) U.S. Cl.
CPC .............. *H02M 7/003* (2013.01); *H02M 1/12* (2013.01)
USPC ........................................... 318/53; 318/112

(58) Field of Classification Search
CPC ............ F25B 2600/021; F25B 49/025; F25B 2400/06; F25B 2400/075; H02M 5/4585; H02M 1/126; H02M 1/12; H02M 5/4505; H02M 1/4208; H02P 5/00; Y02T 10/648
USPC .............................. 318/34, 51, 53, 112, 400.3
See application file for complete search history.

(56) References Cited

U.S. PATENT DOCUMENTS

| 4,276,589 | A | 6/1981 | Okawa et al. |
| 4,508,996 | A | 4/1985 | Clegg et al. |
| 6,198,613 | B1 | 3/2001 | Rozman |
| 6,295,216 | B1 | 9/2001 | Faria et al. |
| 6,404,655 | B1 * | 6/2002 | Welches ........................... 363/41 |
| 7,164,242 | B2 * | 1/2007 | Federman et al. ........ 318/400.21 |
| 7,392,143 | B2 | 6/2008 | Jayabalan et al. |
| 7,854,282 | B2 * | 12/2010 | Lee et al. .................... 180/65.24 |
| 2003/0228503 | A1 * | 12/2003 | Georgii ........................... 429/13 |
| 2011/0049994 | A1 * | 3/2011 | Hiller et al. ..................... 307/82 |

FOREIGN PATENT DOCUMENTS

WO    2011087106 A1    7/2011

OTHER PUBLICATIONS

Extended European Search Report dated Feb. 13, 2013; Application No. 12192649.7—(8 Pages).

\* cited by examiner

*Primary Examiner* — Bentsu Ro
(74) *Attorney, Agent, or Firm* — Boyle Fredrickson, S.C.

(57) ABSTRACT

A distributed motor drive system includes a power management module and multiple inverter modules integrated with the motors and located on a machine or process remote from the power management module. The power management module distributes DC voltage and command signals to each of the inverters. The DC voltage is distributed between modules via a DC link cable. The integrated inverters execute switching routines to convert the DC voltage to an AC voltage suitable for controlling the motor. Each of the power management module and the inverters includes a portion of the DC bus capacitance. The distributed motor drive system also includes a link inductance between the power management module and the inverters to limit the amount of reactive current generated by the inverters.

20 Claims, 3 Drawing Sheets

SYSTEM FOR MANAGING DC LINK SWITCHING HARMONICS

BACKGROUND OF THE INVENTION

The subject matter disclosed herein relates generally to a distributed motor drive system and, more specifically, to an apparatus for managing harmonic currents present on a direct current (DC) link in a distributed motor drive system.

Alternating current (AC) motors receive an AC voltage at the stator of the motor. The speed and torque of the motor are controlled by varying the amplitude and frequency of this AC voltage applied to the stator. In order to provide varying AC voltage waveforms, a motor controller rapidly switches solid state devices on and off at a predetermined switching frequency and, thereby, alternately connects or disconnects the terminals of the motor to a DC voltage. By varying the duration during each switching period for which the terminal of the motor is connected to the DC voltage, the magnitude of the output voltage is varied. The motor controller utilizes modulation techniques such as pulse width modulation (PWM) to control the switching and to synthesize waveforms having desired amplitudes and frequencies.

Industrial applications which utilize servo motors, such as a process line with multiple stations, a machining center, or an industrial robotic arm, often have multiple axes of control. Each axis requires a motor and a controller to regulate, for example, the speed, position, or torque of the motor. The motors are necessarily positioned along the process line or about the machine as needed to actuate a specific motion. The motor controllers are typically located within one or more enclosures at a common location. However, developments in the power electronic devices used to control the motor have reduced the size of the components. This reduction in size of the power electronic devices along with a desire to reduce the size of the control enclosures have led to placing at least a portion of the motor controller electronics on the motor itself.

Such integrated motor and motor controller systems have not been fully met without incurring various disadvantages. According to one such system, the entire motor controller has been mounted on the motor. However, even with the reduction in size of the power electronic components, including the converter, inverter, and DC bus capacitance on the motor still requires a considerable amount of space, especially as the current rating of the motor increase. Further, the heat generated by both the converter and inverter power electronics must be dissipated at the motor.

According to another system for integrating the motor and motor controller, only the inverter section of the motor controller is mounted on the motor. The rectifier section and DC bus capacitance remains in the control enclosure. Although this system reduces the space required on the motor and also reduces the amount of heat that must be dissipated at the motor, another drawback arises. The inverter section receives a DC voltage via a DC link cable from a DC bus output of the rectifier section in the control enclosure. Although a small amount of capacitance may be connected across the DC link at the inverter section, modulation of the solid state devices in the inverter produces harmonic currents at multiples of the inverter switching frequency, which are, subsequently, conducted on the DC link between the inverter section and the control enclosure.

Another disadvantage in such a system is that the DC link cable extending between the control enclosure and the inverter section can establish a resonant frequency as a function of the length of the DC link cable. If the length of the DC link cable is selected such that the resonant frequency is close to the switching frequency of the inverter, the harmonic current on the DC link may be amplified. To avoid amplification of the harmonic current specific lengths of the DC link cable may be required. Alternately, to compensate for the harmonic content the size of the conductor is increased or the current rating of the conductor is reduced. Each of these options introduces an undesirable cost or limitation in the system.

BRIEF DESCRIPTION OF THE INVENTION

The subject matter disclosed herein describes a distributed motor drive system which includes a power management module and multiple inverter modules integrated with the motors and located on a machine or process remote from the power management module. The power management module distributes DC voltage and command signals to each of the inverters. The DC voltage is distributed between modules via a DC link cable. The integrated inverters execute modulation techniques to convert the DC voltage to an AC voltage suitable for controlling the motor. Each of the power management module and the inverters includes a portion of the DC bus capacitance. The distributed motor drive system also includes a link inductance between the power management module and the inverters to limit the amount of reactive current generated by the inverters.

According to a first embodiment of the invention, a DC voltage distribution network includes a power management module and at least one power delivery module. The power management module includes a first DC voltage rail, a second DC voltage rail, and a capacitance connected between the first and second DC voltage rails. The power delivery module includes a first DC voltage rail, a second DC voltage rail, a capacitance connected between the first and second DC voltage rails, an output configured to be connected to a motor, and an electronic switching module selectively connecting one of the first and the second DC voltage rails to the output. The magnitude of the capacitance in the power delivery module is less than the capacitance in the power management module. The DC voltage distribution network also includes a cable connecting the first and second DC voltage rails of the power management module to the first and second DC voltage rails of the power delivery module and an inductance connected in series with the cable between the power management module and the power delivery module.

According to another embodiment of the invention, a distributed motor control system includes a power management module and at least one inverter module. The power management module includes a DC bus configured to receive a DC voltage, at least one capacitor connected across the DC bus, and a processor configured to execute a plurality of instructions to manage distribution of the DC voltage present on the DC bus. The inverter module includes a DC bus configured to receive a DC voltage, at least one capacitor connected across the DC bus, a plurality of electronic switches configured to selectively connect the DC bus to the output to generate a switched AC voltage, and a processor configured to execute a plurality of instructions to generate a plurality of switching signals, each switching signal corresponding to one of the electronic switches. The distributed motor control system also includes a cable connecting the DC bus of the power management module to the DC bus of one of the inverter modules, and an inductance connected in series with the cable between the power management module and the inverter module.

As still another embodiment of the invention, a system for controlling a plurality of motors distributed about an industrial machine or process includes a converter section configured to receive an AC voltage input and to convert the AC voltage input to a DC voltage. A local DC bus receives the DC voltage from the converter section, and a first capacitance is connected across the local DC bus. The system also includes multiple motor control modules. Each motor control module is mounted to one of the motors. The motor control module includes a remote DC bus connected to the local DC bus via at least one DC link cable, a second capacitance smaller than the first capacitance connected across the remote DC bus, and an inverter section including a plurality of switches converting the DC voltage to an AC voltage suitable for controlling the motor. An inductance is connected in series between the local DC bus and the remote DC bus of a first of the motor control modules.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
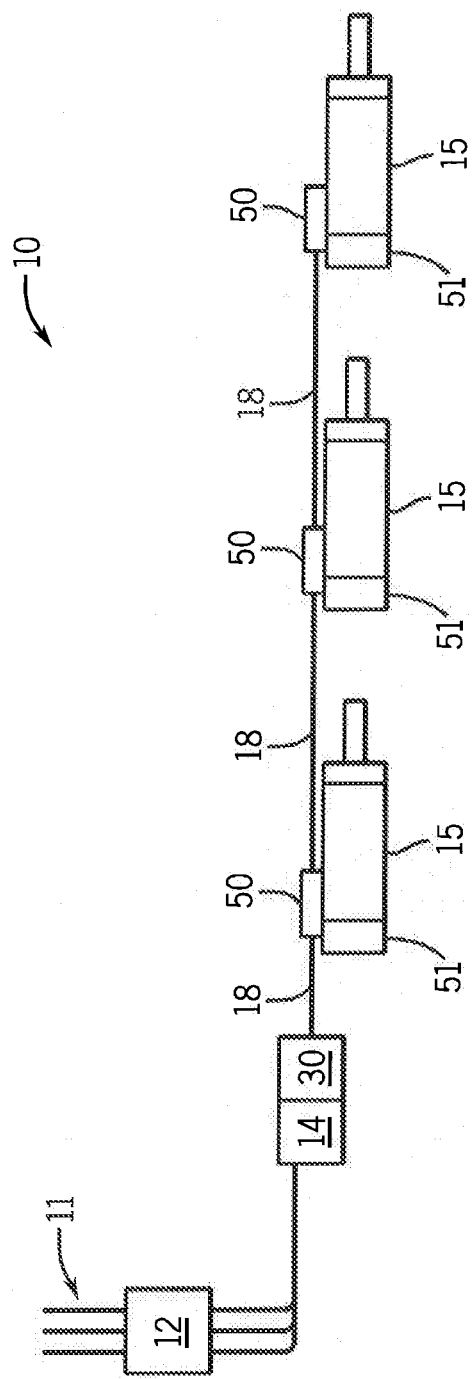
FIG. 1 is an exemplary distributed motor system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, a distributed motor control system 10 according to one embodiment of the invention is disclosed. An input voltage 11 is connected to a converter module 14 via a suitable disconnect 12, such as a fuse block or a circuit breaker. The input power 11 may be any suitable power supply such as three phase or single phase AC voltage, according to the application requirements. The converter module 14 converts the AC voltage into a DC voltage for distribution by the power management module 30. The converter module 14 and power management module 30 are mounted together in a control enclosure positioned near a machine or industrial process to be controlled. It is contemplated that the converter module 14 and the power management module 30 may either be separate modules or integrated as a single module without deviating from the scope of the invention. Further, separate modules may be connected, for example, by electrical conductors or by a backplane connection in a rack-style enclosure. The connection may be used to transmit both power and control signals between modules. Optionally, a DC voltage may be provided directly to the power management module 30 via the disconnect 12.

The power management module 30 is connected in series with each power delivery module, also referred to herein as an inverter module 50. A cable 18 extends between the power management module 30 and a first of the inverter modules 50 as well as between subsequent inverter modules 50. The cable 18 includes all necessary connections to transmit, for example, power, reference commands, and/or network communications between each series connected inverter module 50. The cable may similarly include feedback signals from the inverter module 50 to the power management module 30. The cable 18 may include multiple conductors contained within a single jacket and appropriate shielding, separate conductors for each of the electrical connections, or a combination thereof.

Each power delivery module 50 is mounted to a motor 15. Each motor 15 is mounted remotely from the control enclosure and connected to the machine or industrial process being controlled. The power delivery modules 50 include housings connected to the motor housing, for example, by bolts or which are, optionally, integrally formed with the corresponding motor housing. The voltage output to each motor 15 from the power delivery module 50 may be either a single or multi-phase AC output voltage according to the requirements of the motor 15. Optionally, each motor 15 may include a position sensor 51 such as an encoder or a resolver providing a signal corresponding to the angular position of the motor 15.

Figure 2:
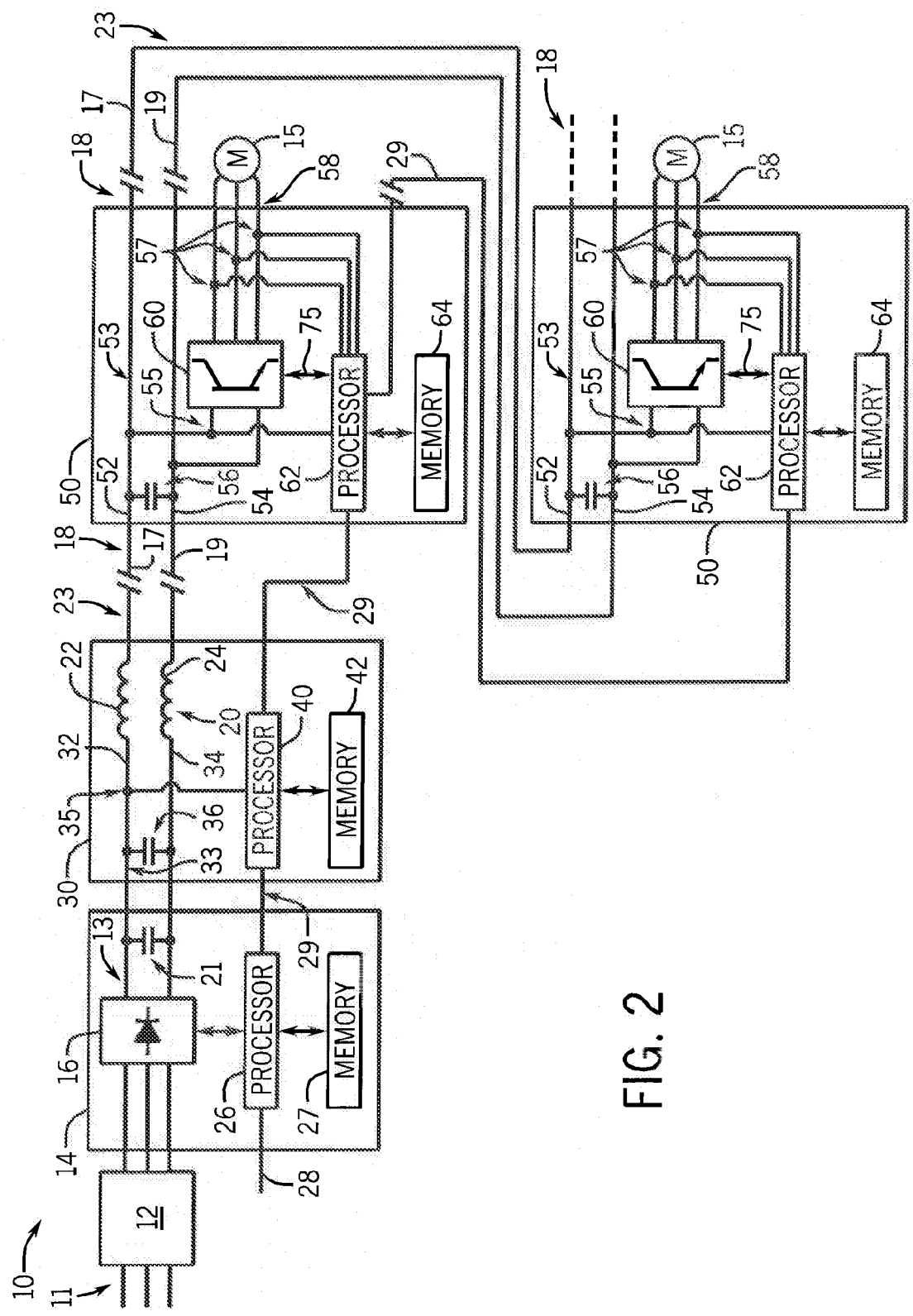
FIG. 2 is a block diagram representation of an exemplary distributed motor system according to one embodiment of the invention.

Referring next to FIG. 2, the converter module 14 includes a rectifier section 16, connected in series between the input voltage 11 and a DC bus 13, and a first DC bus capacitor 21 connected across the DC bus 13. It is understood that the DC bus capacitor 21 may be a single capacitor or multiple capacitors connected in parallel, in series, or a combination thereof. The rectifier section 16 may be either passive or active, where a passive rectifier utilizes electronic devices such as diodes, which require no control signals, and an active rectifier utilizes electronic devices, including but not limited to transistors, thyristors, and silicon controlled rectifiers, which receive switching signals to turn on and off. The converter module 14 also includes a processor 26 and a memory device 27. It is contemplated that the processor 26 and memory device 27 may each be a single electronic device or formed from multiple devices. Optionally, the processor 26 and/or the memory device 27 may be integrated on a field programmable array (FPGA) or an application specific integrated circuit (ASIC). The processor 26 may send or receive signals to the rectifier section 16 as required by the application requirements. The processor 26 is also configured to communicate with external devices via an industrial network 28, including but not limited to, DeviceNet, ControlNet, or Ethernet/IP and its respective protocol. The processor 26 further communicates with other devices within the motor control system 10 via any suitable communications medium 29, such as a backplane connection or an industrial network, which may further include appropriate network cabling and routing devices.

The power management module 30 is connected in series with the converter module 14. Electrical connections are established between the DC bus 13 of the converter module 14 and a DC bus 33 in the power management module 30 to transfer the DC bus voltage between modules. The connections may be made via a backplane connection, a power bus, or via a DC link cable 23. Alternately, if the two modules are integrated, the two DC busses, 13 and 33, may be combined into a single DC bus. The DC bus 33 includes a first voltage rail 32 and a second voltage rail 34. Each of the voltage rails, 32 or 34, are configured to conduct a DC voltage having a desired potential, according to application requirements. According to one embodiment of the invention, the first voltage rail 32 may have a DC voltage at a positive potential and the second voltage rail 34 may have a DC voltage at ground potential. Optionally, the first voltage rail 32 may have a DC voltage at ground potential and the second voltage rail 34 may have a DC voltage at a negative potential According to still another embodiment of the invention, the first voltage rail 32 may have a first DC voltage at a positive potential with respect to the ground potential and the second voltage rail 34 may have a second DC voltage at a negative potential with respect to the ground potential. The resulting DC voltage potential between the two voltage rails, 32 and 34, is the difference between the potential present on the first rail 32 and the second rail 34.

The power management module 30 further includes a processor 40 and a memory device 42. It is contemplated that the processor 40 and memory device 42 may each be a single electronic device or formed from multiple devices. Optionally, the processor 40 and/or the memory device 42 may be integrated on a field programmable array (FPGA) or an application specific integrated circuit (ASIC). The processor 40 in the power management module 30 is in communication with the processor 26 in the converter module 14 via the communications medium 29. The communications medium 29 may be integrated into a backplane connection, integrated with the DC link cable 23 as a single cable, or provided as a separate network cable. The power management module 30 also includes at least one sensor 35 connected to the DC bus 33 and in communication with the processor 40. Each sensor 35 provides a signal to the processor corresponding to an operating condition, such as the amplitude of the voltage or current present on the DC bus 33.

A DC link inductance 20 is mounted within the power management module 30 and connected in series with the DC link cable 23 to a power delivery module 50. Optionally, the inductance 20 may be mounted external to the power management module 30. According to one embodiment of the invention, the DC link inductance includes a first inductor 22 connected in series between the positive voltage rails, 32 and 52, of the power management module 30 and the power delivery module 50 and a second inductor 24 connected in series between the negative voltage rails, 34 and 54, of the power management module 30 and the power delivery module 50.

According to one embodiment of the invention, the DC bus 53 of the first power delivery module 50 is connected in series with the DC bus 33 of the power management module 30 and the DC bus 53 of subsequent power delivery modules 50 are connected in series with the DC bus 53 of the preceding power delivery module 50. Electrical connections are established between the DC bus 53 of each power delivery module and its preceding module via a DC link cable 23 to transfer the DC bus voltage between modules. Similar to the DC bus 33 in the power management module 30, the DC bus 53 in the power delivery module 50 includes a first voltage rail 52 and a second voltage rail 54. Each of the voltage rails, 52 or 54, are configured such that they may conduct a DC voltage having the same potential as the voltage rails, 32 or 34, in the power management module 30.

The power delivery module 50 further includes a processor 62 and a memory device 64. It is contemplated that the processor 62 and memory device 64 may each be a single electronic device or formed from multiple devices. Optionally, the processor 62 and/or the memory device 64 may be integrated on a field programmable array (FPGA) or an application specific integrated circuit (ASIC). The processor 62 in each power delivery module 50 is in communication with preceding module via the communications medium 29. The power communications medium 29 and the DC link cable 23 define, at least in part, the cable 18 extending between modules. The power delivery module 50 also includes at least one sensor 55 connected to the DC bus 53 and in communication with the processor 40. Each sensor 55 provides a signal to the processor corresponding to an operating condition, such as the amplitude of the voltage or current present on the DC bus 33. At least one additional sensor 57 is connected to the output of the inverter section 60 and provides a signal to the processor 62 corresponding to the current in one of the phases of the AC output voltage to the motor 15.

Figure 3:
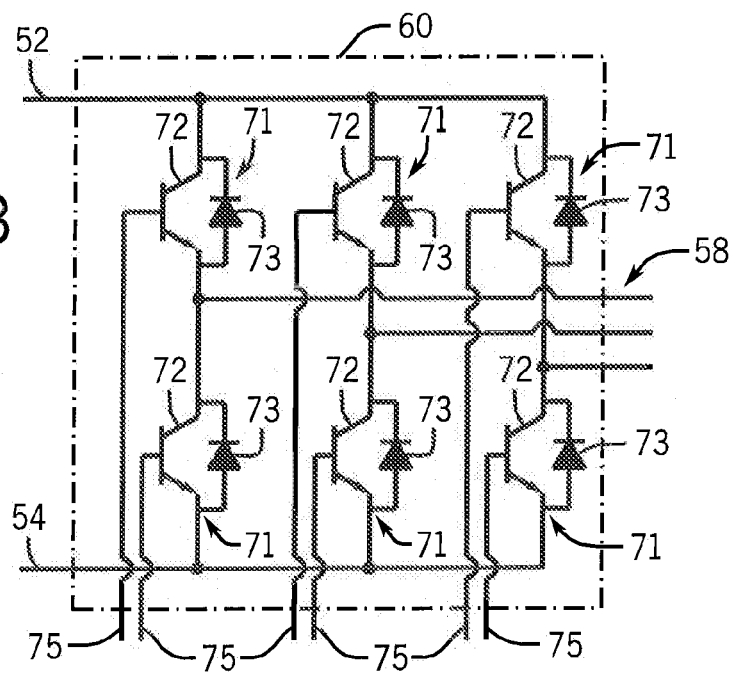
FIG. 3 is a schematic representation of an inverter section from FIG. 2.

A DC bus capacitor 56 is connected between the positive and negative rails, 52 and 54, to reduce the magnitude of the ripple voltage present on the DC bus 53. It is understood that the DC bus capacitor 56 may be a single capacitor or multiple capacitors connected in parallel, in series, or a combination thereof. The magnitude of the voltage potential between the two voltage rails, 52 and 54, is generally about equal to the magnitude of the peak of the AC input voltage 11. The DC voltage on the DC bus 53 is converted to an AC voltage by an inverter section, 60. According to one embodiment of the invention, the inverter section 60 converts the DC voltage to a three-phase output voltage available at an output terminal 58 connected to the motor 15. The inverter section 60 includes multiple switches 71 which selectively connect one of the output phases to either the positive voltage rail 52 or the negative voltage rail 54. Referring also to FIG. 3, each switch 71 may include a transistor 72 and a diode 73 connected in parallel to the transistor 72. Each switch 71 receives a switching signal 75 to enable or disable conduction through the transistor 72 to selectively connect each phase of the output terminal 58 to either the positive voltage rail 52 or the negative voltage rail 54 of the DC bus 53.

In operation, the converter module 14 receives an AC input voltage 11 and converts it to a DC voltage with the rectifier section 16. The AC input voltage 11 may be either a three phase or a single phase AC voltage. If the rectifier section 16 is an active rectifier, the processor 26 will receive signals from the active rectifier corresponding to, for example, amplitudes of the voltage and current on the AC input and/or the DC output. The processor 26 then executes a program stored in memory 27 to generate switching signals to activate and/or deactivate the switches in the active rectifier, where the program includes a series of instructions executable on the processor 26. In addition, the switching signals may be generated such that power may be transferred in either direction between the AC input and the DC output. Whether there is a passive rectifier or an active rectifier, the DC bus capacitor 21 connected across the DC bus 13 reduces the ripple resulting from the voltage conversion. The DC voltage from the DC bus 13 of the converter module 14 is then provided to the DC bus 33 of the power management module 30.

The processor 26 of the converter module 14 may further be configured to communicate with other external devices via the industrial network 28. The processor 26 may receive command signals from a user interface or from a control program executing, for example, on a programmable logic controller. The command signals may include, but are not limited to, speed, torque, or position commands used to control the rotation of each motor 15 in the distributed control system 10. The processor 26 may either pass the commands directly or execute a stored program to interpret the commands and subsequently transmit the commands to each inverter module 50. The processor 26 communicates with the processors, 40 or 62, of the power management module 30 and the inverter modules 50, directly or via a daisy chain topology and suitable communications media 29. Further, the processor 26 may either communicate using the same network protocol with which it received the commands via the industrial network 28 or convert the commands to a second protocol for transmission to subsequent modules, 30 or 50.

The power management module 30 transfers the DC voltage and the control signals received from the converter module 14 to each power delivery module 50. The series connection of the DC bus 33 of the power management module 30 between the DC bus 13 of the converter module 14 and the DC bus 53 of the first power distribution, or inverter, module 50 establishes an electrical conduction path for the DC voltage between the converter module 14 and the inverter module 50. The DC bus capacitor 36 in the power management module 30 further reduces the ripple voltage on the DC bus resulting from voltage conversion. Optionally, the power management module 30 and the converter module 14 may be integrated as a single unit, resulting in the combination of DC busses 13 and 33 into a single DC bus and the combination of DC bus capacitors, 21 and 36, into a single capacitance. The processor 40 receives a signal from at least one sensor 35 corresponding to the amplitude of the current and/or voltage present on the DC bus 33. Further, the processor 40 samples the amplitude of the current from the sensor 35 at a fast enough rate to monitor the amplitude of harmonic currents present on the DC bus 33.

Each power delivery module 50 converts the DC voltage from the DC bus 53 to an AC voltage suitable to control operation of the motor 15 on which it is mounted. The processor 62 executes a program stored on a memory device 64. The processor 62 receives a reference signal via the communications medium 29 identifying the desired operation of the motor 15. The program includes a control module configured to control the motor 15 responsive to the reference signal and to feedback signals, including but not limited to signals from the voltage sensor 55, the current sensors 57, and the position sensor 51. The control module generates a desired voltage reference signal 104, see also FIG. 4. The program further includes a switching module using, for example, pulse width modulation (PWM) to generate switching signals 75 to control the switches 71 responsive to the desired voltage reference signal 104.

Figure 4:
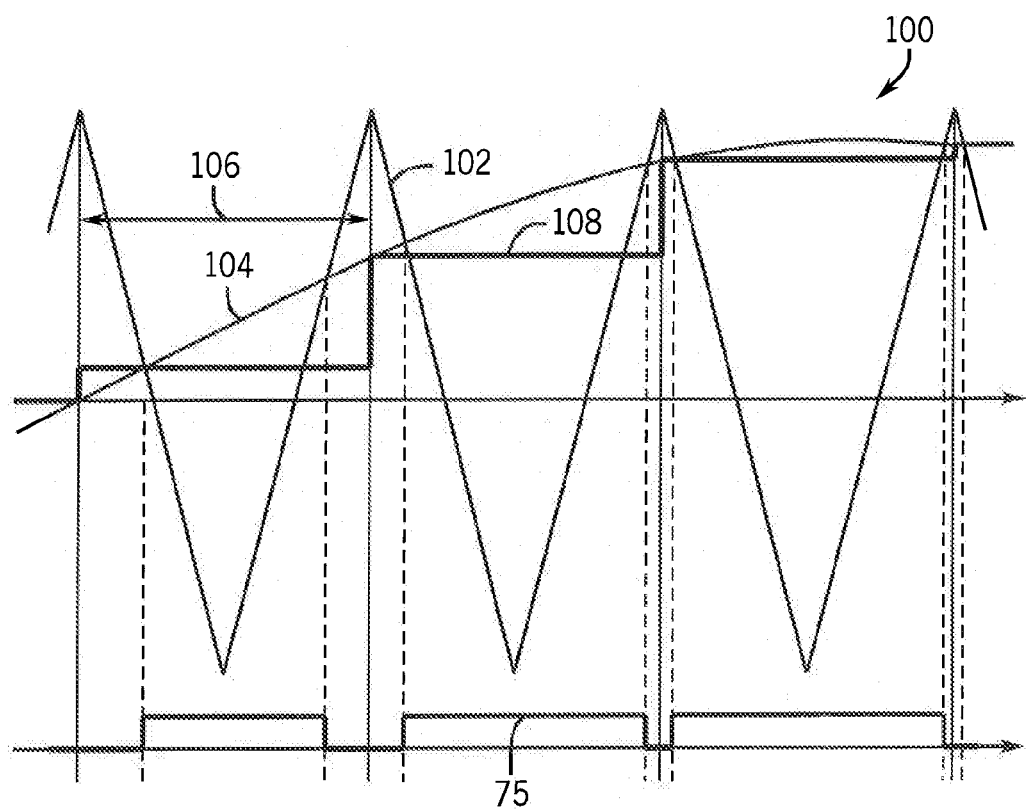
FIG. 4 is a graphical representation of a segment of one phase of an AC voltage output by an inverter section according to a PWM routine.

Referring next to FIG. 4, a segment of one phase of an AC voltage output according to an exemplary sine-triangle PWM modulation technique 100 is illustrated. In the sine-triangle PWM modulation technique 100, a triangular waveform 102 is compared to the voltage reference 104 to generate switching signals 75. The switching signals 75 control the switches 71 that selectively connect or disconnect each phase of the output terminal 58 to either the positive voltage rail 52 or the negative voltage rail 54. One period of the triangular waveform 102 is defined by the switching period 106 of the PWM routine. During the switching period 106, if the voltage reference 104 is greater than the triangular waveform 102, the switching signal 75 is set high and, if the voltage reference 104 is less than the triangular waveform 102, the switching signal 75 is set low. The resulting output voltage 108 can be represented by a stepped waveform where the magnitude of the stepped waveform during each period 106 is the average value of the output voltage 108 during that period 106. The average value is determined by multiplying the magnitude of the DC voltage present on the DC bus 53 by the percentage of the period 106 that the switching signal 75 is set high. As the switching period 106 of the PWM routine decreases, the stepped output voltage 108 more accurately corresponds to the voltage reference 104. It is contemplated that other modulation techniques, as would be known to one skilled in the art, may also be used to generate the output voltage, such as space-vector or multi-level switching. Further, the modulation techniques may be implemented by comparing analog signals, as shown in FIG. 4, digital signals, such as a register being incremented up and down, or a combination thereof.

The alternating connection and disconnection of the switches 71 to the DC bus 53 creates a ripple or fluctuation in the amplitude of the current on the DC bus 53. The amplitude and frequency of the ripple may be affected by many factors, including but not limited to the switching frequency and the modulation technique utilized. The modulation of the switches 71 may generate harmonic currents on the DC bus 53, for example, at the frequency, or multiples thereof, of the switching frequency. Alternately, the switching routine may introduce harmonic currents at still other frequencies. Although the bus capacitor 56 on the power delivery module 50 helps reduce the ripple and the resulting harmonic currents present on the DC bus 53 in the power delivery module 50, the physical size restraints from mounting the power delivery module 50 on the motor 15 restricts the amount of capacitance that may be included in the power delivery module 50, which, in turn, restricts the effectiveness of the capacitance 56 in reducing the harmonic currents.

Although the DC bus capacitor 56 of the power delivery module 50 is connected in parallel with the DC bus capacitors, 21 and 36, of the converter and power management modules, 14 and 30 respectively, increasing the system capacitance, the DC link cable 23 connecting the DC bus 53 of the power delivery module 50 to the DC bus 33 of the power management module 30 may amplify any harmonic current generated by the switches 71 in the power delivery module 50. The DC link cable 23 introduces reactive components, for example a cable inductance, that are a function of the length of the DC link cable 23. Consequently, the amount the current is amplified is a function of the frequency of the harmonic current and the length of the DC link cable 23. Further, the distance the motors 15 and the power delivery modules 50 are located from the central enclosure may vary from one or two meters up to hundreds of meters.

The inductance 20 mounted in series with the DC link cable 23 is configured to mitigate the harmonic currents present in the distributed motor control system 10. The magnitude of the inductance 20 is selected to attenuate harmonic content at the lowest frequency of harmonic current expected in the distributed motor control system 10. As previously discussed, the harmonic currents on the DC link cable 23 are a function of the switching frequency, the modulation technique, the length of the DC link cable 23, and the size of the capacitance 56 present in the power delivery module 50. For example, according to one exemplary embodiment of the invention, a modulation technique is selected resulting in 2nd and 4th harmonic content being present on the DC link cable 23. If the switching frequency is selected at 2 kHz, the resulting harmonic currents would have frequencies at 4 and 8 kHz. The magnitude of the inductance is selected such that the resulting DC link impedance attenuates the 4 kHz harmonic current to an acceptable level. According to another exemplary embodiment of the invention, the harmonic currents generated are a function of the modulation technique implemented. Again, the magnitude of the inductance is selected such that the resulting DC link impedance attenuates the harmonics generated from the modulation technique to an acceptable level. Preferably, the attenuation results in about a 0 dB gain of the harmonic currents.

Although attenuated, the harmonic content on the DC link cable 23 is not eliminated. Thus, the processor 40 is configured to read the signal from the sensor 35 corresponding to the amplitude of the current on the DC bus 33 at a rate fast enough to monitor the harmonic content. The processor 40 is further configured to execute the program to determine what percentage of the current present on the DC bus 33 results from harmonic currents and from DC current. The processor 40 may further be configured to determine if these percentages exceed a predetermined threshold, and, if so, a warning or fault may be generated and communicated via the communication medium 29 and external network 28 to an operator of the motor control system 10.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A DC voltage distribution network, comprising:
   a power management module, further comprising:
      a first DC voltage rail,
      a second DC voltage rail,
      a capacitance connected between the first and second DC voltage rails, and
      a processor configured to execute a plurality of instructions to manage distribution of a DC voltage present between the first and second DC voltage rails;
   at least one power delivery module, further comprising:
      a first DC voltage rail,
      a second DC voltage rail,
      a capacitance connected between the first and second DC voltage rails,
      an output configured to be connected to a motor, and
      an electronic switching module selectively connecting one of the first and the second DC voltage rails to the output;
   a cable connecting the first and second DC voltage rails of the power management module to the first and second DC voltage rails of the power delivery module; and
   an inductance connected in series with the cable between the power management module and the power delivery module.

2. The DC voltage distribution network of claim 1 wherein the magnitude of the capacitance in the power delivery module is less than the capacitance in the power management module.

3. The DC voltage distribution network of claim 1 further comprising at least two power delivery modules wherein the first and the second DC voltage rails of each power delivery module are connected in series.

4. The DC voltage distribution network of claim 1 wherein the cable includes a first and a second electrical conductor and wherein the inductance includes a first and a second inductor connected in series with the first and the second electrical conductor, respectively, between the first and the second DC voltage rails of the power management module and the power delivery module.

5. The DC voltage distribution network of claim 4 wherein the magnitude of the first and the second inductor is a function of the difference in the magnitude of capacitance between the power management module and the power delivery module.

6. The DC voltage distribution network of claim 1 wherein the power delivery module further comprises a processor configured to execute a series of instructions to generate a plurality of switching signals, and wherein the electronic switching module further comprises a plurality of switches controlled by the switching signals to selectively connect one of the first and the second DC voltage rails to the output.

7. The DC voltage distribution network of claim 6 wherein the processor is further configured to generate the switching signals at a predetermined frequency and wherein the magnitude of the inductance is a function of the predetermined frequency.

8. The DC voltage distribution network of claim 6 wherein the processor is further configured to generate the switching signals according to a pulse width modulation (PWM) method and wherein the magnitude of the inductance is a function of the PWM method.

9. The DC voltage distribution network of claim 6 further comprising a current sensing device generating a signal to the power management module corresponding to an amplitude of the current present in the cable.

10. The DC voltage distribution network of claim 9 wherein the processor of the power management module is further configured to execute a series of instructions to determine what percentage of the amplitude of current present in the cable is a function of harmonic content generated by the switching of the power delivery module.

11. A distributed motor control system, comprising:
    a power management module, further comprising:
       a DC bus configured to receive a DC voltage,
       at least one capacitor connected across the DC bus, and
       a processor configured to execute a plurality of instructions to manage distribution of the DC voltage present on the DC bus;
    at least one inverter module, further comprising:
       a DC bus configured to receive a DC voltage,
       at least one capacitor connected across the DC bus,
       a plurality of electronic switches configured to selectively connect the DC bus to the output to generate a switched AC voltage, and
       a processor configured to execute a plurality of instructions to generate a plurality of switching signals, each switching signal corresponding to one of the electronic switches;
    a cable connecting the DC bus of the power management module to the DC bus of one of the inverter modules; and
    an inductance connected in series with the cable between the power management module and the inverter module.

12. The distributed motor control system of claim 11 further comprising a converter module configured to receive an AC voltage input and provide a DC voltage output to the power management module.

13. The distributed motor control system of claim 11 further comprising a plurality of motors wherein each inverter module is mounted on the motor.

14. The distributed motor control system of claim 11 wherein the cable includes a first and a second electrical conductor and wherein the inductance includes a first and a second inductor connected in series with the first and the second electrical conductor, respectively, between the DC bus of the power management module and the DC bus of the inverter module.

15. The distributed motor control system of claim 11 wherein the processor of the inverter module is further configured to generate the switching signals at a predetermined frequency and wherein the magnitude of the inductance is a function of the predetermined frequency.

16. A system for controlling a plurality of motors distributed about an industrial machine or process, the system comprising:
   a converter section configured to receive an AC voltage input and to convert the AC voltage input to a DC voltage;
   a local DC bus receiving the DC voltage from the converter section;
   a first capacitance connected across the local DC bus;
   a processor configured to execute a plurality of instructions to manage distribution of the DC voltage present on the DC bus;
   a plurality of motor control modules, wherein each motor control module is mounted to one of the motors, the motor control module further comprising:
      a remote DC bus connected to the local DC bus via at least one DC link cable,
      a second capacitance smaller than the first capacitance connected across the remote DC bus, and
      an inverter section including a plurality of switches converting the DC voltage to an AC voltage suitable for controlling the motor; and
   an inductance connected in series between the local DC bus and the remote DC bus of a first of the motor control modules.

17. The system of claim 16 wherein the plurality of DC link cables connect each of the motor control modules in series with each other.

18. The system of claim 16 wherein the housing of the motor control module is integrally formed with the housing of the motor.

19. The system of claim 16 wherein each of the DC link cables includes a first and a second electrical conductor and wherein the inductance includes a first and a second inductor connected in series with the first and the second electrical conductor, respectively.

20. The system of claim 16 wherein the motor control module further comprises:
   an output configured to conduct the AC voltage to the motor; and
   a processor configured to execute a series of instructions to generate a plurality of switching signals at a predetermined frequency, wherein the switches in the inverter section are controlled by the switching signals to selectively connect the DC bus to the output and wherein the magnitude of the inductance is a function of the predetermined frequency.

* * * * *